March 18, 1969  Y. SUNDBERG ET AL  3,433,878
LINE TRANSMISSION IN ARC FURNACES
Filed June 9, 1966

INVENTORS
YNGVE SUNDBERG
BY ERIK SVANTESSON
Bailey, Stephens & Huettig
ATTORNEYS United States Patent Office 3,433,878
Patented Mar. 18, 1969

3,433,878
LINE TRANSMISSION IN ARC FURNACES
Yngve Sundberg and Erik Svantesson, Vasteras, Sweden, assignors to Allmänna Svenska Elektriska Aktiebolaget, Vasteras, Sweden, a corporation of Sweden
Filed June 9, 1966, Ser. No. 556,298
Claims priority, application Sweden, June 10, 1965, 7,618/65
U.S. Cl. 13—14　　　　　　　　　　　　　　　4 Claims
Int. Cl. H05b 7/10

ABSTRACT OF THE DISCLOSURE

A line transmission between a suspended cable or cables from a multiphase furnace transformer to the electrodes of a multiphase arc furnace, each electrode is attached at the end of an electrode arm. Around the two outer electrode arms there are arranged tubular bodies of a material having high electrical conducting capacity, which bodies serve as conductors for electric current in the corresponding phases of the multiphase-fed furnace.

---

Figure 1:
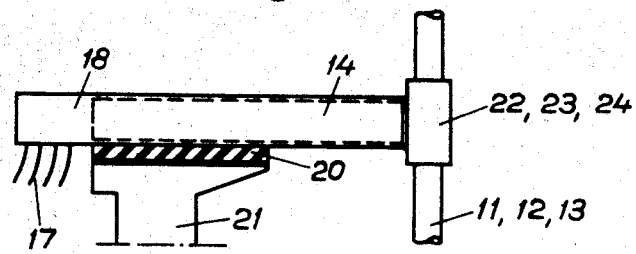

The present invention relates to line transmission on electrode arms for polyphase arc furnaces.

In normal line transmission between furnace transformers and electrodes the different phases are more or less in the same plane all the way. This means that there is a tendency for the reactance to be less for the central conductor than for the outer conductors, which in turn causes uneven current distribution. Different methods have been tried to compensate for this asymmetry.

One method has been to place the supply conductors, for instance those on the electrode arms, each in its own corner of an imaginary equilateral triangle. One disadvantage with this has been the problem of space and problems with insulating the electrode arms. It has also been tried to make two large outer conductors and a weaker central conductor, placed completely or substantially with its centre in a horizontal plane, or in triangular form, but with lower triangle height than with an equilateral triangle.

Another method has been to double or multiply the outer conductors, but in this case in order to obtain as low a reactance as possible it is necessary to keep the mutual distance between the phases as small as possible. This type of arrangement will also be relatively bulky and entails certain complications in the construction.

The invention relates to a construction of the current conductors on the electrode arms for a polyphase, for example three-phase, furnace, and is characterised in that the current conductor to at least one electrode arm is composed of a casing arranged around the electrode arm and consisting of material having high electrical conducting capacity, such as copper or aluminium. The electrode arm inside the conductor may be of normal construction having high mechanical stability. The current conductor can be made with a large cross-sectional surface so that the thermal losses can be kept low. Tubes for the supply of cooling water to the electrode terminals and tubes for the supply of compressed air to the means for operating the electrode terminals can easily be arranged inside the conductor.

In a preferred embodiment a current conductor casing is arranged around each of the outer electrode arms, possibly in contact with the enclosed electrode arm. Thus it is not necessary to arrange insulation between current conductor and electrode arm, which decreases both weight and other construction problems. It has been found that since, with a suitable choice of thickness for the casing, the current flows along the outer current conductor surface, no appreciable heating of the electrode arm is caused by the current. In the same preferred embodiment the current conductor for the central electrode is placed above the corresponding electrode arm, whereby inductance symmetry for the different phases can be attained, either only for the parts in the vicinity of the electrode arms or possibly also for the whole conductor length including suspension cables and conductors at the furnace transformer.

The reactance for the different conductors in the case shown will be low. The invention is more fully exemplified in the accompanying figures, in which FIGURE 1 shows an electrode arm with current conductor and electrode mast, FIGURE 2 a section through three phase conductors on the electrode arms and FIGURE 3 a view from above of a three-phase electrode furnace.

Figure 3:
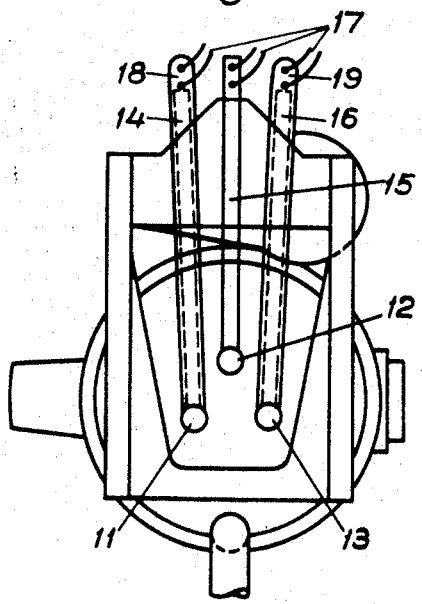

FIGURE 3 shows a three phase arc furnace with three electrodes 11, 12 and 13, each with its own electrode arm 14, 15 and 16 with connected suspension cables 17. The outer electrode arms 14 and 16 (see FIGURE 1) are enclosed by respective current conductors 18 and 19, respectively, and the current conductors with the enclosed arms rest through an intermediate insulation 20, for example of asbestos wool, on a mast 21, separate for each phase or common for the electrode arms of the different phases. At the end of the arm (FIGURE 1) is attached an electrode terminal 22, 23 and 24, operated by means of an operating device not shown, for example a pneumatic cylinder. Pressure medium conduits may run inside the current conductor. The current conductor 18-19 extends backwards past the electrode arm 14-16 and at its end are attached suspension cables 17. Cooling of the current conductor and electrode arm with the electrode terminal may be carried out by means of internal cooling water tubes.

Figure 2:
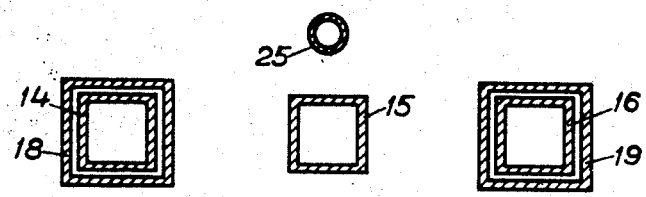

In FIGURE 2 are shown the three phases with electrode arms 14 and 16 within the current conductors 18 and 19 for the two outer phases in a three-phase system. The electrode arms have, like the current conductors, a rectangular cross-section. In the central phase the current conductor 25 has a tube shape and is placed so far above the electrode arm 15 that the iron losses in the latter will be low. The cross section of the outer conductor and central conductor have been chosen so that inductance symmetry is obtained, possibly for the whole current conductor system to the furnace transformer. D-connection may be carried out near the electrode arms on the secondary side of the furnace transformer or elsewhere.

In the outer conductors the iron losses will be very small, as will the reactance, and due to the great conductor area the resistance losses (copper losses) will be small.

The shape of the current conductor can, of course, be varied in many ways, for example it can be polygonal or elliptical and as conductor material may be chosen, besides copper, aluminium or some other material having low resistivity. The conductor plate of copper may be made with as small a thickness as 1 mm. without any appreciable portion of the current flowing into the construction steel below, despite the absence of insulation between arm and conductor. It is assumed that in this case alternating current with a frequency of 50 cycles per second is used.

It has been found that with the arrangement described above a considerably lower reactance is obtained than with previously known conductor arrangements according to the preamble to the specification. Different variations are feasible within the scope of the following claims.

We claim:

1. Line transmisison for a multiphase fed arc furnace said transmission having a plurality of electrode arms positioned in a group in substantially side-by-side relation, an electrode carried by each of said arms, the outermost arms of the group having tubular casings mounted on and encompassing the electrode arms, said tubular casings being connected to the electrodes and constituting electrical conductors for supplying electric current to the electrodes.

2. In a line transmission as claimed in claim 1, said casings being of square cross-section.

3. In a line transmission as claimed in claim 1, a third electrode arm between the outermost electrode arms and a third conductor for the electrode of the third electrode arm positioned above and spaced from the third electrode arm.

4. In a line transmission for a three-phase furnace, as claimed in claim 3, the current conductors having such cross-sectional areas and the third current conductor being spaced on such a distance from its electrode arm that reactance symmetry between the three phases is obtained.

References Cited

UNITED STATES PATENTS

| 1,432,823 | 10/1922 | Young | 13—16 |
| 2,879,336 | 3/1959 | Tudbury | 336—195 X |
| 2,469,740 | 5/1949 | Moore | 13—9 |
| 2,908,736 | 10/1959 | Ernst | 13—9 |

BERNARD A. GILHEANY, *Primary Examiner.*

HIRAM B. GILSON, *Assistant Examiner.*

U.S. Cl. X.R.

13—9